US009368034B2

(12) United States Patent
Shin et al.

(10) Patent No.: US 9,368,034 B2
(45) Date of Patent: Jun. 14, 2016

(54) REAR WARNING CONTROL METHOD AND SYSTEM FOR VEHICLE

(71) Applicant: Hyundai Motor Company, Seoul (KR)

(72) Inventors: Wonho Shin, Seoul (KR); Jongil Yu, Gyeonggi-Do (KR); Haijin Seo, Gyeoggi-do (KR)

(73) Assignee: Hyundai Motor Company, Seoul (KR)

( * ) Notice: Subject to any disclaimer, the term of this patent is extended or adjusted under 35 U.S.C. 154(b) by 46 days.

(21) Appl. No.: 14/136,511

(22) Filed: Dec. 20, 2013

(65) Prior Publication Data

US 2014/0203924 A1 Jul. 24, 2014

(30) Foreign Application Priority Data

Dec. 28, 2012 (KR) ........................ 10-2012-0157491

(51) Int. Cl.

| | |
|---|---|
| ***B60Q 1/00*** | (2006.01) |
| ***G08G 1/16*** | (2006.01) |
| ***E05B 85/00*** | (2014.01) |
| *E05B 83/22* | (2014.01) |

(52) U.S. Cl.

CPC *G08G 1/16* (2013.01); *E05B 85/01* (2013.01); *E05B 83/22* (2013.01); *G08G 1/168* (2013.01)

(58) Field of Classification Search

CPC .......... G08G 1/16; G08G 1/168; E05B 83/22; E05B 85/01; B60R 1/00; B60R 1/04; B60R 1/12; B60R 2001/1215; B60R 2001/1253; B60R 2001/1276; B60R 2300/106; B60R 2300/8053; B60R 2300/806

USPC ................ 340/435, 932.2, 901, 903; 348/148

See application file for complete search history.

(56) References Cited

U.S. PATENT DOCUMENTS

| | | | | |
|---|---|---|---|---|
| 5,872,507 | A * | 2/1999 | Weber et al. | 340/435 |
| 2011/0050886 | A1* | 3/2011 | Thompson et al. | 348/135 |
| 2012/0053785 | A1* | 3/2012 | Wittorf | 701/36 |

FOREIGN PATENT DOCUMENTS

| | | | |
|---|---|---|---|
| JP | 2008-248582 | A | 10/2008 |
| JP | 2011-168258 | A | 9/2011 |
| KR | 1997-002451 | B1 | 3/1997 |
| KR | 10-2012-0035122 | | 4/2012 |
| KR | 10-2012-0086576 | | 8/2012 |

* cited by examiner

*Primary Examiner* — Thomas Mullen

(74) *Attorney, Agent, or Firm* — Mintz Levin Cohn Ferris Glovsky and Popeo, P.C.; Peter F. Corless

(57) ABSTRACT

A rear warning system for a vehicle that detects information regarding an area behind a vehicle and is operated based on the detected information. The system includes sensors configured to detect the information regarding the area behind the vehicle and a guiding device operated by a controller to provide a notification of the information regarding the area behind the vehicle received from the sensors. The sensors include an ultrasonic wave sensor configured to detect a target object spaced farther from the rear of the vehicle than a predetermined distance and a capacitance sensor configured to detect the target object closer than or equal to the predetermined distance.

21 Claims, 4 Drawing Sheets

REAR WARNING CONTROL METHOD AND SYSTEM FOR VEHICLE

CROSS-REFERENCE TO RELATED APPLICATION

This application claims priority to and the benefit of Korean Patent Application No. 10-2012-0157491 filed in the Korean Intellectual Property Office on Dec. 28, 2012, the entire contents of which are incorporated herein by reference.

BACKGROUND (a) Field of the Invention

The present invention relates to a rear warning system for a vehicle and a control method thereof, and more particularly, to a rear warning system for a vehicle with improved performance of detecting an obstacle positioned at a rear of the vehicle closer than or equal to a predetermined distance, and a control method thereof.

(b) Description of the Related Art

In general, a rear warning system for a vehicle is a device mounted on the vehicle and prevents a vehicle accident by providing a notification that an obstacle exists at the rear of the vehicle when the vehicle is reversed. The rear warning system is also called a rear detecting system. Further, a parking aid system (e.g., a parking assist system) is a system that has the same concept as that of the rear warning system. In other words, the rear warning system refers to a system that automatically detects an obstacle positioned at a rear of the vehicle when the vehicle is reversed due to parking or other reasons.

Additionally, an ultrasonic wave sensor is mainly used for the detection of the obstacle. Further, the ultrasonic wave sensor is mounted at a rear bumper of the vehicle. The ultrasonic wave sensor operates when a driver shifts into reverse gear, and when the obstacle is detected closer than or equal to a predetermined distance, and the ultrasonic wave sensor is operated to transfer a warning sound to the driver. Further, when a distance between the vehicle and the obstacle decreases, an interval of the warning sound may be less frequent or a sound of the warning sound may be louder.

Recently, various rear warning systems for the vehicle employing a method of displaying a distance to a rear obstacle via a display device and a method of photographing the rear of the vehicle using an imaging device (e.g., a camera) and displaying the photographed rear have been developed, in addition to a method of a notification of a distance between the vehicle and the obstacle by changing an interval of the sound.

However, when the obstacle positioned at the rear of the vehicle is detected using the ultrasonic wave sensor, the obstacle positioned at the rear of the vehicle may not be detected at a substantially short distance. Particularly, when a distance between the vehicle and the obstacle is equal to or less than about 30 cm, a non-sensed area of the ultrasonic wave sensor may be generated.

Moreover, a detecting sensor approach and an intention of opening a trunk of a user is used in a device, such as a hands-free lift gate, enabling the user to open the trunk of the vehicle without the use of hands. Further, the sensor may be mounted at a rear side of the vehicle.

However, according to the automation of several devices of the vehicle, a considerable number of high-priced sensors are mounted in the vehicle. That is, a manufacturing cost of the vehicle may be increased.

The above information disclosed in this section is only for enhancement of understanding of the background of the invention and therefore it may contain information that does not form the prior art that is already known in this country to a person of ordinary skill in the art.

SUMMARY

The present invention provides a rear warning system for a vehicle capable of effectively detecting an obstacle positioned at a rear of the vehicle closer than or equal to a predetermined distance, and a method of controlling the rear warning system. Further, the present invention provides a rear warning system for a vehicle capable of both detecting an obstacle at the rear of the vehicle and performing a function of a hands-free lift gate, and a method of controlling the same.

An exemplary embodiment of the present invention provides a rear warning system for a vehicle, which detects information regarding the area behind the vehicle and is operated according to the detected information, the rear warning system including: a plurality of sensors configured to detect the information regarding the area behind the vehicle; a guiding device configured to notify a driver of the information regarding the area behind the vehicle; and an electronic control unit (ECU) configured to operate the guiding device by receiving the information detected by the sensors, in which the sensors include an ultrasonic wave sensor configured to detect a target object spaced farther from the rear of the vehicle than a predetermined distance, and a capacitance sensor configured to detect the target object closer than or equal to the predetermined distance.

The system may further include a trunk opening device configured to selectively open a trunk of the vehicle via a command of the electronic control unit based on the information detected by the sensors. The ultrasonic wave sensor may be configured to detect an approach of a user at the rear of the vehicle, and the capacitance sensor may be configured to detect a movement of the user in the vicinity of the rear of the vehicle. When an intention of the user to open the trunk is detected by the information detected by the ultrasonic wave sensor and the capacitance sensor, the trunk opening device, executed by the ECU, may open the trunk. The guiding device may be configured to notify the driver of the information regarding the area behind the vehicle via a voice or an image. Further, the sensor may be mounted on a rear surface of a rear bumper of the vehicle.

Another exemplary embodiment of the present invention provides a method of controlling a rear warning system for a vehicle, the rear warning system may include an ultrasonic wave sensor configured to detect information regarding the area behind (e.g., rear) the vehicle, a capacitance sensor configured to detect information regarding the area behind the vehicle closer than or equal to a predetermined distance, and an electronic control unit configured to operate a guiding device to transfer the information regarding the rear to a driver, the method including: determining whether the vehicle is in a key-on state; detecting whether the vehicle is in an ignition-on state; determining whether a shift speed is a reverse shift speed; determining the information regarding the area behind the vehicle via the ultrasonic wave sensor; and detecting the information regarding the area behind the vehicle via the capacitance sensor.

The method of controlling the rear warning system for the vehicle may further include: when the ultrasonic wave sensor detects an obstacle positioned in the rear of the vehicle, calculating a distance between the vehicle and the obstacle; comparing the calculated distance between the vehicle and the obstacle with a predetermined distance; notifying the driver of the calculated distance between the vehicle and the obstacle; when the capacitance sensor detects the obstacle positioned in the rear of the vehicle, determining a type of obstacle; and notifying the driver of the type of obstacle positioned at the rear of the vehicle.

When the ultrasonic wave sensor fails to detect the obstacle positioned at the rear of the vehicle, the capacitance sensor may be configured to detect the obstacle positioned in the rear of the vehicle. In addition, when the calculated distance between the vehicle and the obstacle is closer than or equal to the predetermined distance, the capacitance sensor may be configured to detect the obstacle positioned at the rear of the vehicle. When it is determined that the vehicle is in the key-on state and in the ignition-on state, and the shift speed is in the reverse shift speed, the ultrasonic wave sensor may be configured to detect the information regarding the area behind the vehicle.

Yet another exemplary embodiment of the present invention provides a method of controlling a rear warning system for a vehicle, the rear warning system comprising a plurality of sensors configured to detect information regarding the area behind the vehicle and an electronic control unit configured to operate a guiding device or a trunk opening device based on the information regarding the area behind the vehicle, the method including: determining whether the vehicle is in a key-on state; determining whether the vehicle is in an ignition-on state; determining whether a shift speed is a reverse shift speed; detecting the information regarding the area behind the vehicle; and operating the trunk opening device in response to determining that the vehicle is not in the key-on state.

The method of controlling the rear warning system for the vehicle may further include: calculating a distance between an obstacle positioned at the rear of the vehicle and the vehicle; notifying a driver of the calculated distance between the vehicle and the obstacle; determining a type of obstacle positioned at the rear of the vehicle; and notifying the driver of the type of obstacle positioned at the rear of the vehicle.

When the calculated distance between the vehicle and the obstacle is closer than or equal to the predetermined distance, the type of obstacle may be determined. When it is satisfied that the vehicle is in the key-on state and in the ignition-on state, and the shift speed is the reverse shift speed, the sensors may be configured to detect the information regarding the area behind the vehicle. The operating of the trunk opening device may include: detecting a movement of a user positioned at the rear of the vehicle; determining an intention of the user to open the trunk based on the movement of the user; and opening the trunk.

Figure 1:
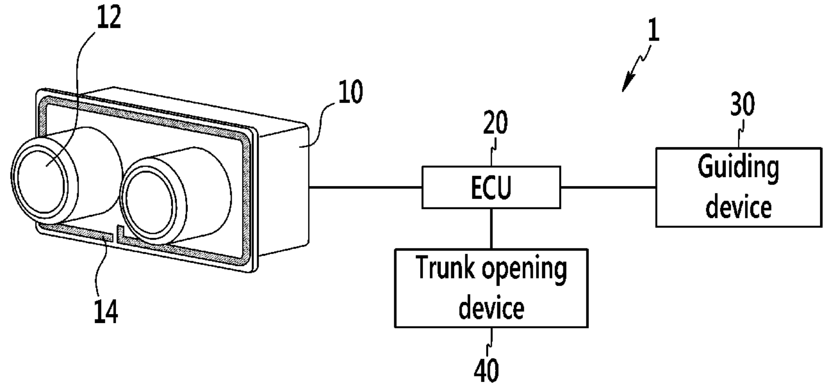
FIG. 1 is an exemplary diagram of a rear warning system for a vehicle according to an exemplary embodiment of the present invention.

| Description of symbols | |
| --- | --- |
| 1: Rear warning system | 10: Sensor |
| 12: Ultrasonic wave sensor | 14: Capacitance sensor |
| 20: Electronic control unit | 30: Guiding device |
| 40: Trunk opening device | 42: Trunk |
| 50: Rear bumper | |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable media include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings.

Figure 2:
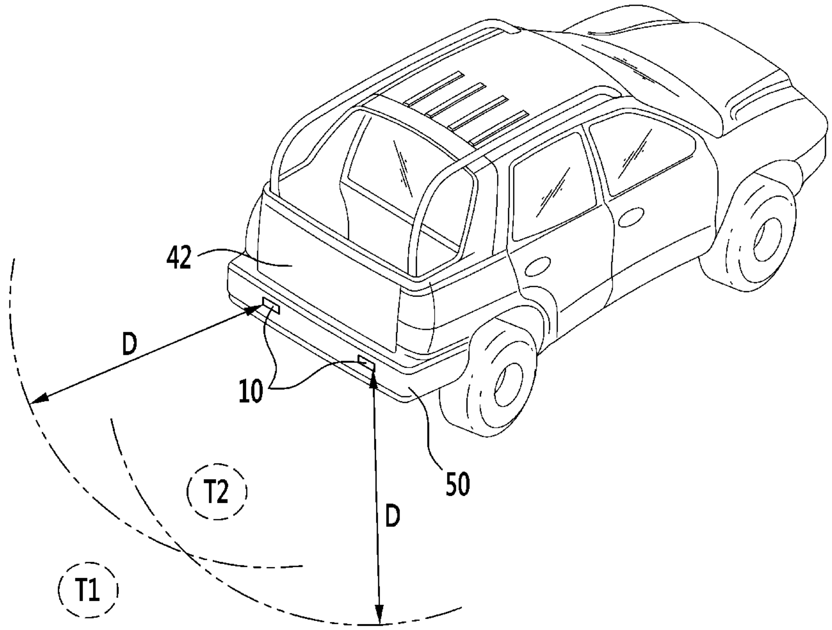
FIG. 2 is an exemplary diagram illustrating a sensor mounted within the vehicle according to an exemplary embodiment of the present invention.

FIG. 1 is an exemplary diagram of a rear warning system for a vehicle according to an exemplary embodiment of the present invention, and FIG. 2 is an exemplary diagram illustrating sensors mounted within the vehicle according to an exemplary embodiment of the present invention.

As illustrated in FIGS. 1 and 2, a rear warning system 1 for a vehicle according to an exemplary embodiment of the present invention may include a plurality of sensors 10, an electronic control unit (ECU) 20, a guiding device 30, and a trunk opening device 40. Further, the sensors 10 may be mounted within a rear bumper 50 of the vehicle.

The sensors 10 may include an ultrasonic wave sensor 12 and a capacitance sensor 14. The ultrasonic wave sensor 12 is a sensor that detects a distance between the vehicle and a target object and a direction of the target object by transmitting an ultrasonic wave to a target object and receiving the reflected ultrasonic wave. The capacitance sensor 14 is a sensor that quantifies a physical quantity using an electricity storage effect of charges. Further, the capacitance sensor 14 may be used to detect a distance between the vehicle and the target object positioned closer than or equal to a predetermined distance and a type of target object. The electronic control unit 20 may be a general electronic control unit configured to operate the electronic devices of the vehicle. The ultrasonic wave sensor 12, the capacitance sensor 14, and the electronic control unit 20 are obvious to a person of ordinary skill in the art, thus a more detailed description thereof will be omitted.

The electronic control unit 20 may be connected with the sensors 10 mounted within the rear bumper 50, and may be configured to receive information regarding the area behind the vehicle from the sensors 10. Further, the electronic control unit 20 may be configured to receive information regarding a target object positioned farther than a predetermined distance Dp from the vehicle via the ultrasonic wave sensor 12. In addition, the electronic control unit 20 may be configured to receive information regarding a target object positioned closer than or equal to the predetermined distance Dp from the vehicle via the capacitance sensor 14.

FIG. 2 illustrates that the two sensors 10 may be mounted apart from each other in left and right directions from the rear center of the rear bumper 50. As shown in FIG. 2, the left and right sensors 10 may be configured to detect information regarding an obstacle positioned within a range T1 and T2, respectively, defined by a radius D (i.e., predetermined distance Dp) extending from their respective mounted positions on the rear bumper 50. However, the number and an arrangement of the sensors 10 are not limited thereto, and may be variously modified and applied according to a design of a person of an ordinary skill in the art considering the performance of the sensor and a manufacturing cost of the vehicle.

The guiding device 30 may be connected with the electronic control unit 20, and may be operated based on a command of the electronic control unit 20. Further, the electronic control unit 20 may be configured to operate the guiding device 30 based on the information received from the sensor 10. When the vehicle is reversed, the sensor 10 may be operated to detect information regarding the obstacle, such as a type of obstacle positioned at the rear of the vehicle and a distance between the vehicle and the obstacle, and the guiding device 30 may be operated to provide a notification of the information regarding the obstacle. In particular, the guiding device 30 may be configured to notify a user of the information regarding the obstacle via a voice or an image. In other words, the guiding device 30 may be disposed within the vehicle to allow the driver to recognize the information regarding the obstacle. In addition, the voice of the guiding device 30 may be a guidance message or a warning sound, and the image of the guiding device 30 may be a simple image, such as a symbol, or an image captured by a rear imaging device (not illustrated).

The trunk opening device 40 may be connected with the electronic control unit 20, and may be operated based on a command of the electronic control unit 20. Further, the electronic control unit 20 may be configured to operate the trunk opening device 40 based on the information received from the sensor 10. In a key-off state of the vehicle, the sensor 10 may be configured to detect a movement of the user positioned at the rear of the vehicle, and the trunk opening device 40 may be configured to selectively open the trunk 42 of the vehicle based on the movement of the user. In particular, the trunk opening device 40 and the sensor 10 may be included in the general hands-free lift gate. In other words, the sensor 10 may be used for both of the rear detection and the hands-free lift gate. The hands-free lift gate, which is a device that allows the user to open the trunk of the vehicle without the use of hands, is obvious to a person of an ordinary skill in the art, thus a more detailed description thereof will be omitted.

Figure 3:
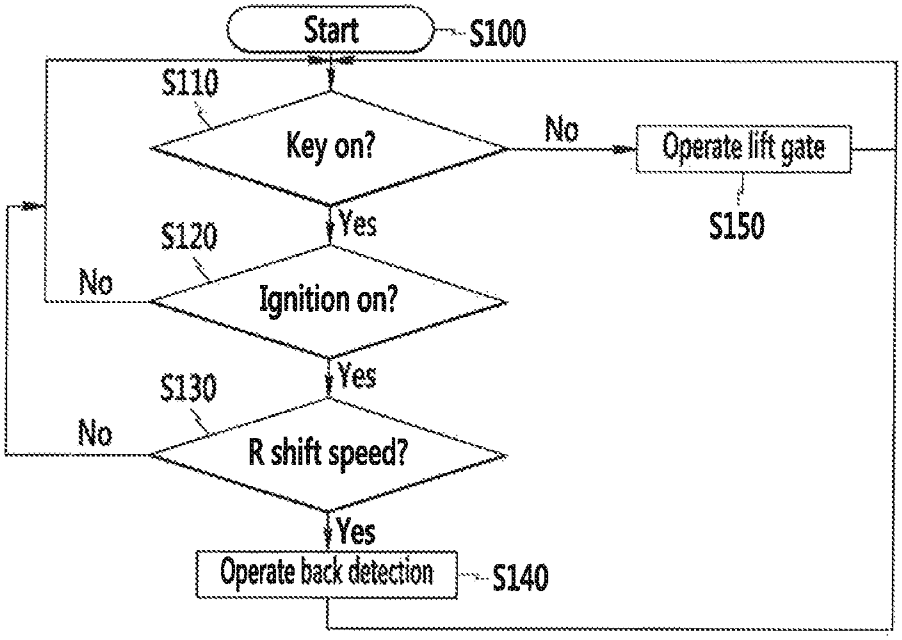
FIG. 3 is an exemplary flowchart of a method of controlling the rear warning system for the vehicle according to the exemplary embodiment of the present invention.

FIG. 3 is an exemplary flowchart of a method of controlling the rear warning system for the vehicle according to the exemplary embodiment of the present invention. As illustrated in FIG. 3, when a driver operates the rear warning system 1 (S100), the electronic control unit 20 may be configured to determine whether the vehicle is in a key-on state (S110).

In response to determining that the vehicle is in the key-on state, the electronic control unit 20 may be configured to determine whether the vehicle is in an ignition-on state (S120). However, in response to determining that the vehicle is not in the key-on state, the electronic control unit 20 may be configured to operate the hands-free lift gate of the rear warning system 1 (S150). Further, when the control of the operation of the hands-free lift gate is completed, the process of operating the rear warning system returns to the determining whether the vehicle is in the key-on state (S110).

In response to determining that the vehicle is in the ignition-on state, the electronic control unit 20 may be configured to determine whether a shift speed is manipulated to a reverse (R) shift speed (S130). In response to determining that the vehicle is not in the ignition-on state, the process of operating the rear warning system returns to the determining whether the vehicle is in the key-on state (S110).

Furthermore, in respond to determining that the shift speed is the reverse (R) shift speed, the electronic control unit 20 may be configured to execute a rear detection operation of the rear warning system 1 (S140). When the execution of the rear detection operation is completed, the process of operating the rear warning system returns to the determining whether the vehicle is in the key-on state (S110). In response to determining that the shift speed is not the reverse (R) shift speed, the process of operating the rear warning system returns to the determining whether the vehicle is in the key-on state (S110).

Hereinafter, the process of controlling the rear detection operation of the rear warning system 1 (S140) will be described with reference to FIG. 4.

Figure 4:
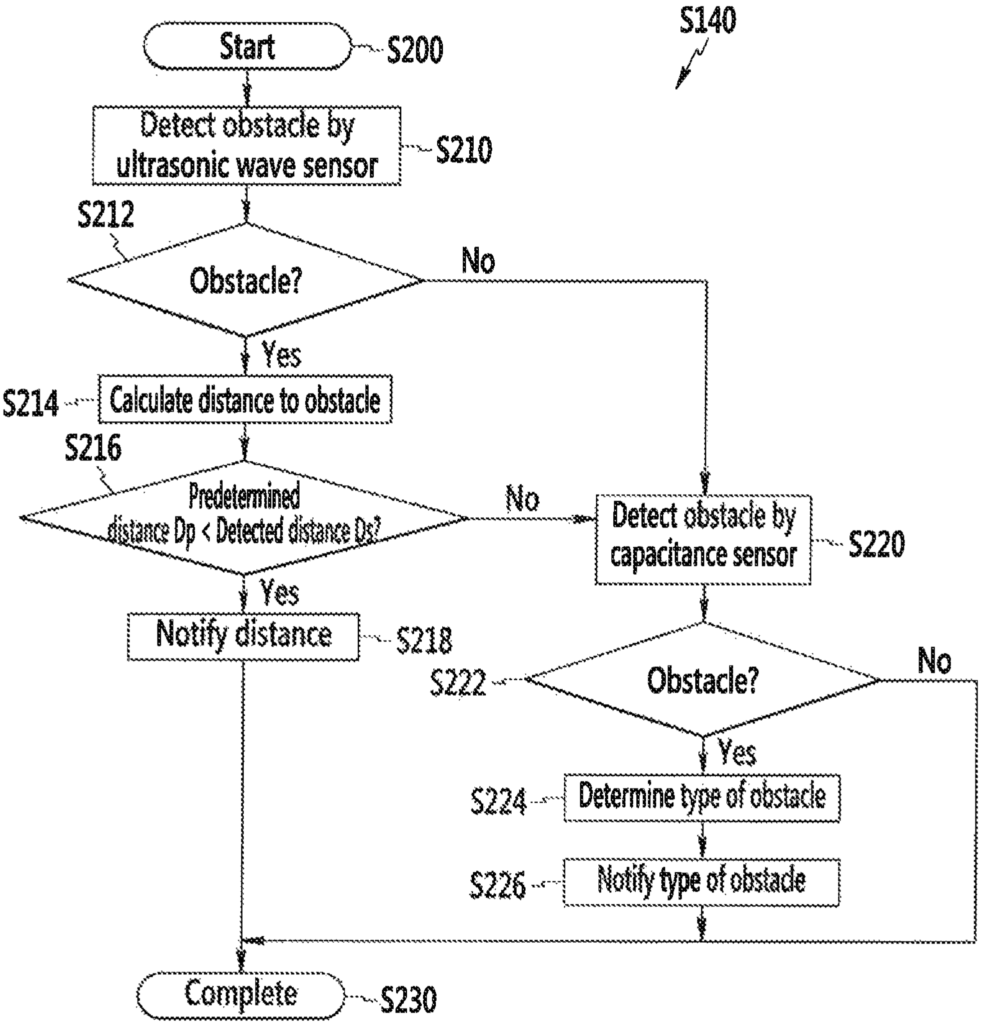
FIG. 4 is an exemplary flowchart of a rear detection operation according to the exemplary embodiment of the present invention.

FIG. 4 is an exemplary flowchart of the rear detection operation according to the exemplary embodiment of the present invention. As illustrated in FIG. 4, when the rear detection operation is started (S200), the electronic control unit 20 may be configured to operate the ultrasonic wave sensor 12 to detect an obstacle (S210). Further, the electronic control unit 20 may be configured to determine whether an obstacle is present at the rear of the vehicle by receiving information from the ultrasonic wave sensor 12 (S212). In particular, the starting of the rear detection operation (S200) may include a process in which the sensor 10 starts the operation. In other words, the rear detection operation may be started and the sensor 10 may simultaneously be turned on.

In response to determining, by the ultrasonic wave sensor 12, that the obstacle is present at the rear of the vehicle, the electronic control unit 20 may be configured to calculate a distance between the obstacle and the vehicle based on the information received from the ultrasonic wave sensor 12 (S214). Further, the electronic control unit 20 may be configured to compare a calculated detected distance Ds between the obstacle and the vehicle and a predetermined distance Dp determined based on a detectable range by the ultrasonic wave sensor 12 (S216).

In response to determining that the detected distance Ds is greater than the predetermined distance Dp, the guiding device 30 may be configured to receive a command from the electronic control unit 20, and provide a notification (e.g., a first notification) to the driver of information regarding the detected distance Ds (S218). In particular, an image or a voice may be used for a method of notifying the driver of the information regarding the detected distance Ds.

In response to determining from the information via the ultrasonic wave sensor 12 that the obstacle is not present (S212), or in response to determining that the detected distance Ds is not greater than the predetermined distance Dp (S216), the electronic control unit 20 may be configured to operate the capacitance sensor 14 to detect the obstacle (220). Further, the electronic control unit 20 may be configured to determine whether the obstacle is present at the rear of the vehicle by receiving information from the capacitance sensor 14 (S222).

Additionally, in response to determining that the obstacle is present at the rear of the vehicle using the capacitance sensor 14, the electronic control unit 20 may be configured to determine a type of obstacle based on the information received from the capacitance sensor 14 (S224). Further, the guiding device 30 may be configured to receive a command based on the type of obstacle from the electronic control unit 20, and provide a notification (e.g., a second notification) to the driver regarding information on the type of obstacle (S226). In particular, when the type of obstacle is a person or a living thing, a warning voice or a warning image having relatively higher recognition than other voice or images may be transferred to the driver.

Moreover, when the information regarding the detected distance Ds is transferred to the driver (S218), the information regarding the type of obstacle may be transferred to the driver (S226), or it may be determined that the obstacle is not present from the information via the capacitance sensor 14, the process (S140) of executing the rear detection operation of the rear warning system 1 may be completed (S230).

As described above, when the process (S140) of executing the rear detection operation is completed, the process of executing the rear warning system returns to determining whether the vehicle is in the key-on state (S110) (see FIG. 3).

Figure 5:
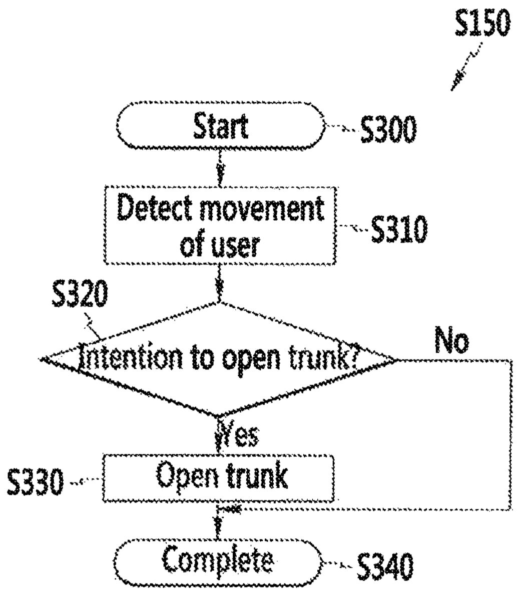
FIG. 5 is an exemplary flowchart of a lift gate operation according to the exemplary embodiment of the present invention.

Hereinafter, the process (S150) of executing the operation of the hands-free lift gate of the rear warning system 1 will be described with reference to FIG. 5. FIG. 5 is an exemplary flowchart of the operation of the lift gate according to the exemplary embodiment of the present invention.

As illustrated in FIG. 5, when an operation of the lift gate is started (S300), the electronic control unit 20 may be configured to operate the sensor 10 to detect a movement of the user positioned at the rear of the vehicle (S310). In particular, the starting of the operation of the lift gate (S300) may include a process in which the sensor 10 starts an operation. That is, the operation of the lift gate may be started, and the sensor 10 may be simultaneously turned on. Further, in the detecting of the movement of the user positioned at the rear of the vehicle by the sensor 10 (S300), the ultrasonic wave sensor 12 may be configured to detect an approach of the user to the rear of the vehicle, and the capacitance sensor 14 may be configured to detect a movement of the user in a predetermined vicinity of the rear of the vehicle.

The electronic control unit 20 may be configured to receive information regarding a movement of the user from the ultrasonic wave sensor 12 and the capacitance sensor 14, and determine an intention of the user to open the trunk (S320). In response to determining that the user desires to open the trunk, the trunk opening device 40 may be configured to open the trunk 42 according to a command of the electronic control unit 20 (S330). When the trunk 42 is opened (S330) or it is determined that the user does not desire to open the trunk (S320), the executing of the operation of the hands-free lift gate of the rear warning system 1 (S150) may be completed (S340).

As described above, when the executing of the operation of the hands-free lift gate (S150) is completed, the process of operating the rear warning system returns to the determining whether the vehicle is in the key-on state (S110) (see FIG. 3).

Moreover, FIG. 1 illustrates that the process of operating the rear warning system 1 for the vehicle according to the exemplary embodiment of the present invention may be continuously circulated, but the operation (S100) and the completion of the rear warning system 1 may be performed according to a manipulation of the driver. Further, even in a key-off state of the vehicle, the operation (S100) of the rear warning system 1 may be maintained.

As described above, according to the exemplary embodiment of the present invention, it may be possible to improve detection of previously not sensed areas by effectively detecting the obstacle positioned at the rear of the vehicle at a predetermined distance (e.g., a distance substantially shorter than the related art). Further, the sensor 10 may also be used for the hands-free lift gate, thereby decreasing a manufacturing cost of the vehicle.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A rear warning system for a vehicle, which detects information regarding an area and any presence of an obstacle behind a rear of the vehicle and is operated based on the detected information, the rear warning system comprising:

a plurality of sensors configured to detect the information; and a guiding device operated by a controller and configured to receive the information detected by the plurality of sensors and provide a notification regarding the information, wherein the plurality of sensors include:

an ultrasonic wave sensor configured to detect the obstacle spaced farther from the rear of the vehicle than a predetermined distance; and a capacitance sensor configured to detect the obstacle closer than or equal to the predetermined distance.

2. The rear warning system of claim 1, further comprising:

a trunk opening device operated by the controller to selectively open a trunk of the vehicle based on the information detected by the sensors.

3. The rear warning system of claim 2, wherein the ultrasonic wave sensor is configured to detect an approach of a user to the rear of the vehicle and the capacitance sensor is configured to detect a movement of the user closer than or equal to the predetermined distance to the rear of the vehicle.

4. The rear warning system of claim 3, wherein in response to detecting a movement of the user indicating an intention to open the trunk based on the information detected by the ultrasonic wave sensor and the capacitance sensor, the trunk opening device is operated by the controller to open the trunk.

5. The rear warning system of claim 1, wherein the guiding device is operated by the controller to provide a notification regarding the obstacle behind the vehicle via a voice or an image.

6. The rear warning system of claim 1, wherein the plurality of sensors are mounted at an outwardly-facing rear surface of a rear bumper of the vehicle.

7. A method of controlling a rear warning system for a vehicle, the method comprising:

determining, by a controller, whether the vehicle is in a key-on state;

determining, by the controller, whether the vehicle is in an ignition-on state;

determining, by the controller, whether a gear shift is in a reverse gear;

detecting, by an ultrasonic wave sensor, information regarding an area and any presence of an obstacle behind a rear of the vehicle; and detecting, by a capacitance sensor, the information.

8. The method of claim 7, further comprising:

in response to detecting the obstacle positioned behind the rear of the vehicle via the ultrasonic wave sensor, calculating, by the controller, a distance between the vehicle and the obstacle;

comparing, by the controller, the calculated distance between the vehicle and the obstacle with a predetermined distance;

providing, by the controller, a first notification of the calculated distance between the vehicle and the obstacle;

in response to detecting the obstacle positioned behind the rear of the vehicle via the capacitance sensor, determining, by the controller, a type of obstacle; and providing, by the controller, a second notification of the type of obstacle positioned behind the rear of the vehicle.

9. The method of claim 8, wherein:

when the ultrasonic wave sensor fails to detect the obstacle positioned behind the rear of the vehicle, detecting, by the capacitance sensor, the obstacle positioned behind the rear of the vehicle.

10. The method of claim 8, wherein:

when the calculated distance between the vehicle and the obstacle is closer than or equal to the predetermined distance, detecting, by the capacitance sensor, the obstacle positioned behind the rear of the vehicle.

11. The method of claim 7, wherein:

in response to determining that the vehicle is in the key-on state and in the ignition-on state, and the gear shift is in the reverse gear, detecting, by the ultrasonic wave sensor, the information.

12. A method of controlling a rear warning system for a vehicle, the method comprising:

determining, by a controller, whether the vehicle is in a key-on state;

determining, by the controller, whether the vehicle is in an ignition-on state;

determining, by the controller, whether a gear shift is in a reverse gear;

detecting, by a plurality of sensors, information regarding an area and any presence of an obstacle behind the rear of the vehicle; and in response to determining that the vehicle is not in the key-on state, operating, by the controller, a trunk opening device.

13. The method of claim 12, further comprising:

calculating, by the controller, a distance between the obstacle positioned behind the rear of the vehicle and the vehicle;

providing, by the controller, a first notification of the calculated distance between the vehicle and the obstacle;

determining, by the controller, a type of obstacle positioned behind the rear of the vehicle; and providing, by the controller, a second notification of the type of e obstacle positioned behind the rear of the vehicle.

14. The method of claim 13, wherein:

when the calculated distance between the vehicle and the obstacle is closer than or equal to a predetermined distance, determining, by the controller, the type of the obstacle.

15. The method of claim 12, wherein:

in response to determining that the vehicle is in the key-on state and in the ignition-on state, and the gear shift is in the reverse gear, detecting, by the plurality of sensors, the information.

16. The method of claim 12, wherein the operating of the trunk opening device includes:

detecting, by the controller, a movement of a user positioned behind the rear of the vehicle;

determining, by the controller, an intention to open the trunk based on the movement of the user; and opening, by the controller, the trunk.

17. A non-transitory computer readable medium containing program instructions executed by a processor or controller and regarding a vehicle, the computer readable medium comprising:

program instructions that determine whether the vehicle is in a key-on state;

program instructions that determine whether the vehicle is in an ignition-on state;

program instructions that determine whether a gear shift is in a reverse gear;

program instructions that control an ultrasonic wave sensor to detect information regarding an area and any presence of an obstacle behind the vehicle; and program instructions that control a capacitance sensor to detect the information.

18. The non-transitory computer readable medium of claim 17, further comprising:

program instructions that calculate a distance between the vehicle and the obstacle in response to detecting the presence of an obstacle positioned behind the rear of the vehicle via the ultrasonic wave sensor;

program instructions that compare the calculated distance between the vehicle and the obstacle with a predetermined distance;

program instructions that provide a first notification of the calculated distance between the vehicle and the obstacle;

program instructions that determine a type of the obstacle in response to detecting the obstacle positioned behind the rear of the vehicle via the capacitance sensor; and program instructions that provide a second notification of the type of the obstacle positioned behind the rear of the vehicle.

19. The non-transitory computer readable medium of claim 18, further comprising:

program instructions that control the capacitance sensor to detect the obstacle positioned behind the rear of the vehicle when the ultrasonic wave sensor fails to detect the obstacle positioned behind the rear of the vehicle.

20. The non-transitory computer readable medium of claim 18, further comprising:

program instructions that control the capacitance sensor to detect the obstacle positioned behind the rear of the vehicle when the calculated distance between the vehicle and the obstacle is closer than or equal to the predetermined distance.

21. The non-transitory computer readable medium of claim 17, further comprising:

program instructions that control the ultrasonic wave sensor to detect the information in response to determining that the vehicle is in the key-on state and in the ignition-on state, and the gear shift is in the reverse gear.

* * * * *